United States Patent [19]

Takagi et al.

[11] Patent Number: 4,909,100
[45] Date of Patent: Mar. 20, 1990

[54] DIFFERENTIAL GEAR DEVICE INCORPORATING INTERNAL MESHING TYPE PLANETARY REDUCTION GEAR

[75] Inventors: Izumi Takagi, Akashi; Kiyoji Minegishi, Aichi, both of Japan

[73] Assignees: Sumitomo Heavy Industries, Ltd., Tokyo; Kawasaki Jukogyo Kabushiki Kaisha, Kobe, both of Japan

[21] Appl. No.: 304,449

[22] Filed: Feb. 1, 1989

[30] Foreign Application Priority Data

Feb. 5, 1988 [JP] Japan .................................. 63-23763
Jul. 11, 1988 [JP] Japan ................................ 63-171045

[51] Int. Cl.$^4$ ............................................. F16H 1/40
[52] U.S. Cl. ..................................... 475/174; 475/202
[58] Field of Search ................. 74/710, 713, 798, 803, 74/804, 694

[56] References Cited

U.S. PATENT DOCUMENTS

| | | | |
|---|---|---|---|
| 1,322,689 | 11/1919 | Griffing | 74/713 X |
| 3,037,400 | 6/1962 | Sundt | 74/804 |
| 4,282,777 | 8/1981 | Ryffel et al. | 74/804 |
| 4,480,500 | 11/1984 | Yamamori et al. | 74/713 |

Primary Examiner—Leslie A. Braun
Assistant Examiner—Khoi Q. Ta
Attorney, Agent, or Firm—Armstrong, Nikaido, Marmelstein, Kubovcik & Murray

[57] ABSTRACT

A differential gear device incorporating an internal meshing type planetary reduction gear has an externally toothed gear carried by a hollow input shaft through an eccentric member and an eccentric bearing, an internally toothed gear meshing with the externally toothed gear, a differential gear box disposed adjacent to the externally toothed gear, and a hollow drive splined at its one end to the externally toothed gear and splined at its other end to the differential gear box. The device also has a left axle and a right axle one of which extends through the hollow input shaft.

3 Claims, 5 Drawing Sheets

DIFFERENTIAL GEAR DEVICE INCORPORATING INTERNAL MESHING TYPE PLANETARY REDUCTION GEAR

BACKGROUND OF THE INVENTION

1. Field of the Invention

The present invention relates to a differential gear device incorporating an internal meshing type planetary reduction gear having an internally toothed gear composed of pins or a combination of pins and rollers, and an externally toothed gear having a trochoidal or arcuate tooth form.

2. Description of the Prior Art

A differential gear is used, for example, in the driving system of a vehicle for the purpose of driving left and right driving wheels of the vehicle in such a manner as to absorb difference in the rotation speed between both driving wheels when the vehicle turns around a corner.

FIG. 4 illustrates an intersecting axis type differential gear device which is the most popular one. This differential gear device has a drive shaft 3 the axis of which intersects the axes of the left and right axles 1 and 2 which extend to the left and right.

FIG. 5 shows a parallel axis type differential gear device which is adopted in many vehicles of FF (front engine front drive) type. In this type of differential gear device, a drive shaft 3 extends in parallel with left and right axles 1 and 2 which extend to the left and right.

A two-staged differential gear device of the parallel axis type, specifically intended for use in four-wheel driving vehicles, is also known in which a primary differential gear device and a secondary differential gear device are connected in series, as disclosed in Japanese Utility Model Unexamined Publication No. 61-188065. In this type of differential gear device, the rotation of the output shaft of the transmission is transmitted from an output gear on the output shaft to a ring gear provided on the gear box of the primary differential gear device, and the rotation speed is primarily reduced due to the difference in the number of gear teeth of the output gear and the ring gear. In addition, one of the rotary shafts of the primary differential gear device is hollow, while the other serves as the gearbox of the secondary differential gear device. One of the rotary shafts of the secondary gear device extends through this hollow rotary shaft.

The following problems are encountered with these known differential gear devices.

Referring first to the intersecting axis type differential gear device shown in FIG. 4, the device inevitably has a large size because the axis of the drive shaft 3 substantially orthogonally intersects the axes of the left and right axles 1 and 2. In addition, it is difficult to obtain a large reduction ratio with this type of differential gear device.

The differential gear device of parallel axis type shown in FIG. 5 can have a more compact design but the reduction in the size is still unsatisfactory. This type of differential gear device cannot provide large reduction ratio.

The differential gear device of the type disclosed in Japanese Utility Model Unexamined Publication No. 61-188065 is designed specifically for four-wheel driving vehicles such that one of the rotary gears of the primary differential gear device is made hollow to allow one of the rotary shafts of the secondary differential gear device to extend therethrough. The primary differential gear device is not intended for use as a reduction gear, though the speed is reduced primarily when the rotation is transmitted from the output gear of the transmission to the primary differential gear device. With this type of differential gear device, it is difficult to obtain a compact design and large reduction ratio, as in the case of the differential gear device of the parallel axis type.

SUMMARY OF THE INVENTION

Accordingly, an object of the present invention is to provide a differential gear device incorporating an internal meshing type planetary reduction gear which enables the differential gear device to have a reduced size and which provides a large reduction ratio.

To this end, according to the present invention, there is provided a differential gear device incorporating an internal meshing type planetary reduction gear comprising: an externally toothed gear carried by a hollow input shaft through an eccentric member and an eccentric bearing; an internally toothed gear meshing with the externally toothed gear; a differential gear box disposed adjacent to the externally toothed gear; a hollow drive which provides a driving connection between the externally toothed gear and the differential gear box; internal splines or external splines provided on the externally toothed gear; external splines or internal splines provided on the differential gear box; external splines or internal splines provided on one end of the drive and engaging with the internal splines or external splines of the externally toothed gear; internal splines or external splines provided on the other end of the drive and engaging with the external splines or internal splines of the differential gear box; and left and right axles extending to the left and right from the differential gear box; one of the left and right axles extending through the input shaft.

These and other objects, features and advantages of the present invention will become clear from the following description of the preferred embodiments taken in conjunction with the accompanying drawings.

DESCRIPTION OF THE PREFERRED EMBODIMENTS

Figure 1:
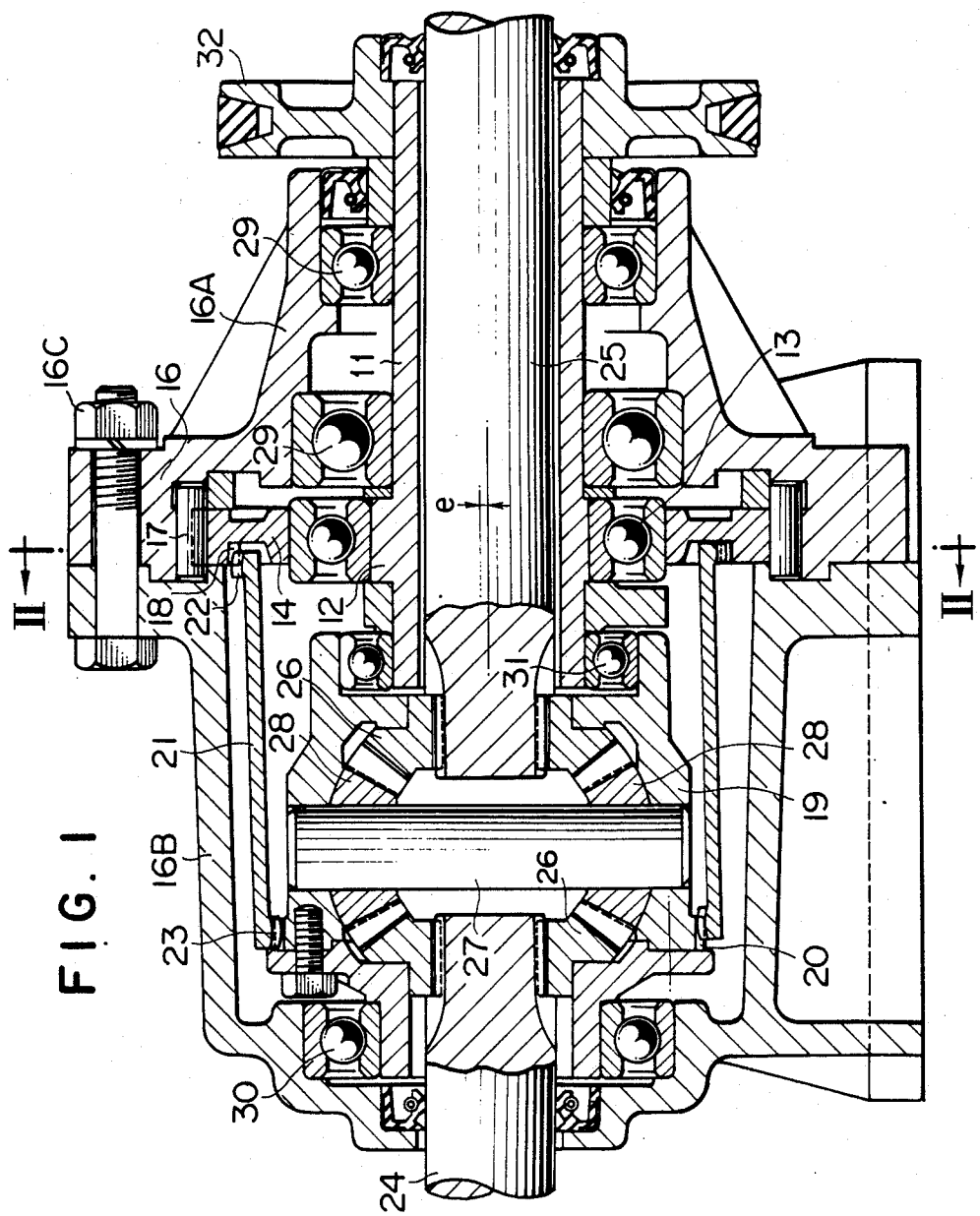
FIG. 1 is a sectional view of an embodiment of the differential gear device in accordance with the present invention.
Figure 2:
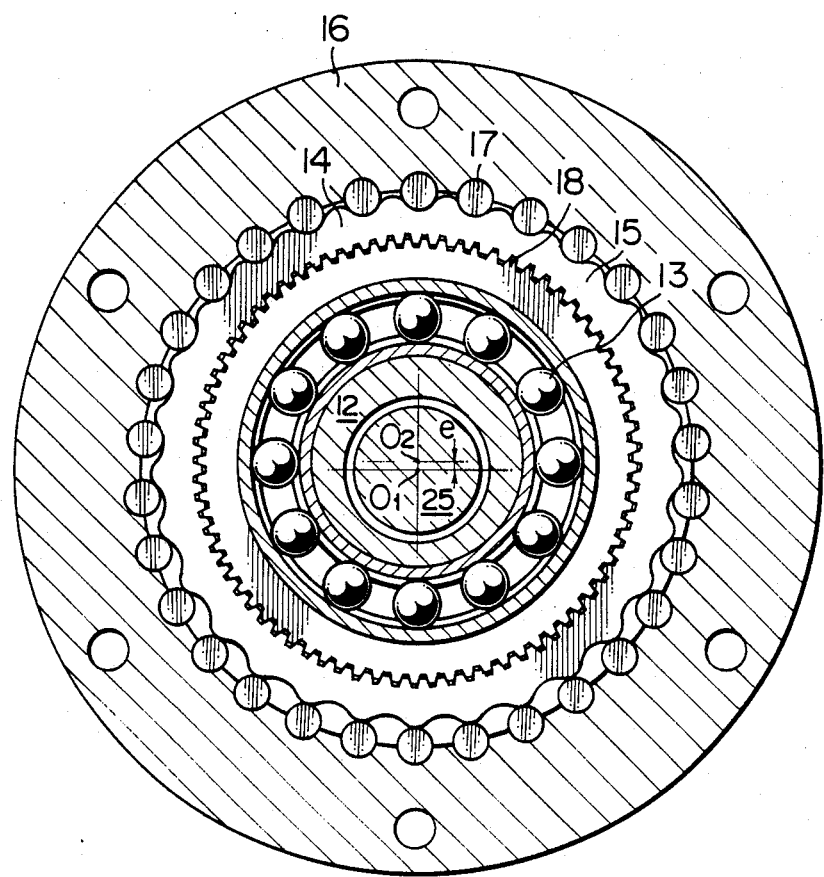
FIG. 2 is a sectional view taken along the line II—II of FIG. 1.

Referring to FIGS. 1 and 2, a first embodiment of the differential gear device in accordance with the present invention has a hollow input shaft 11 carrying an eccentric member 12 which in turn carries an externally toothed gear 14 through an eccentric member bearing 13. The externally toothed gear 14 has an axis $O_2$ which is offset by an amount e from the axis $O_1$ of the input shaft 11 or from the axis of an internally toothed gear 16 which will be mentioned later. The external teeth 15 of the externally toothed gear 14 have a suitable gear form such as trochoidal form or an arcuate form and mesh with internal teeth of the internally toothed gear 16 which are provided by outer pins 17.

The externally toothed gear 14 is provided with internal splines 18 which are coaxial with the external teeth 15.

On the other hand, external splines 20 coaxial with the input shaft 11 are provided on the differential gear box 19 disposed adjacent to the externally toothed gear 14. A drive 21 supported in a floating manner is disposed between the internal splines 18 and the external splines 20. The drive 21 is a hollow cylindrical member and accommodates a differential gear box 19.

The drive 21 is provided at its one end with external splines 22 meshing with the internal splines 18 and at its other end with internal splines 23 which engage with the external splines 20.

The differential gear box 19 has left and right axles 24 and 25 which extend to the left and right therefrom. Each of the left and right axles 24 and 25 is provided with a bevel gear 26. It is to be noted that one of the axles, the right axle 25 in the illustrated case, extends through the input shaft 11. An arm 27, which extends orthogonally to the left and right axles 24, 25, also is provided with bevel gears 28.

The internally toothed gear 16 serves also as a cashing. Thus, the internally toothed gear 16 is composed of a left casing part 16B and a right casing part 16A which are fastened to each other by means of bolts 16C.

A bearing 29 is interposed between the right casing part 16A and the input shaft 11, while a bearing 30 is disposed between the left casing part 16B and the differential gear box 19. A bearing 31 also is provided between the differential gear box 19 and the input shaft 11. Transmission of rotation to the input shaft 11 is conducted through a pulley 32. The pulley 32, however, may be substituted by a gear.

In operation, rotation of the input shaft 11 causes rotation of the eccentric member 12 which is then transmitted to the externally toothed gear 14 through the eccentric member 13. Partly because the axis $O_1$ of the input shaft 11 is offset from the axis $O_2$ of the externally toothed gear 14 by the amount e, and partly because the externally toothed gear 14 is connected to the drive 21 which is oscillatably supported, the revolution of the externally toothed gear 14 about the axis $O_1$ of the input shaft 11 is absorbed by the oscillatory motion of the drive 21. In consequence, only the rotation of the input shaft 11 is picked up through the engagement between the externally toothed gear 14 and the external pins 17, at a reduction ratio which is given by 1/n (n being the number of the external teeth), when the difference between the number of the external teeth and the number of the outer pins is 1. The rotation of the externally toothed gear 14 is transmitted to the drive 21, whereby the differential gear box 19 is rotated at a reduced speed through the drive 21.

The rotation of the differential gear box 19 allows the left and right axles to rotate at different speeds in a manner which is known per se and, hence, not described.

Figure 3:
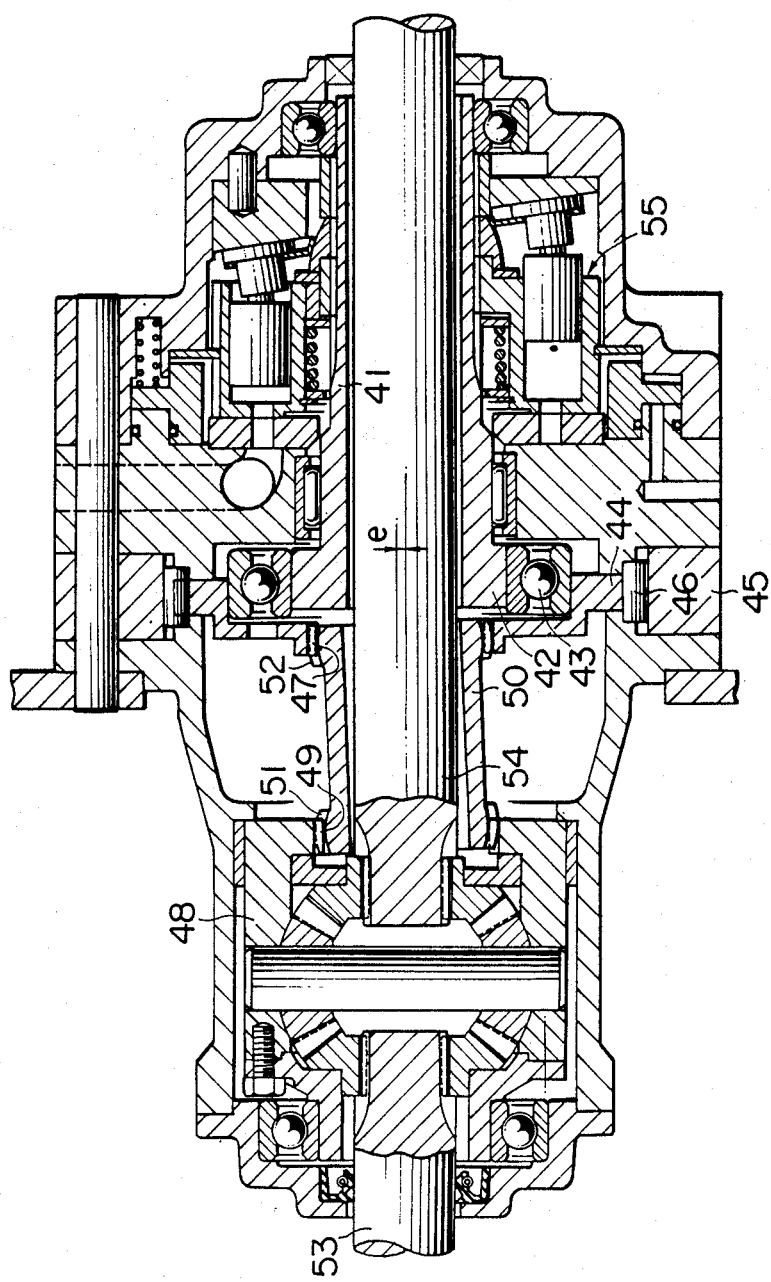
FIG. 3 is a sectional view of another embodiment of the differential gear device in accordance with the present invention.
Figure 4:
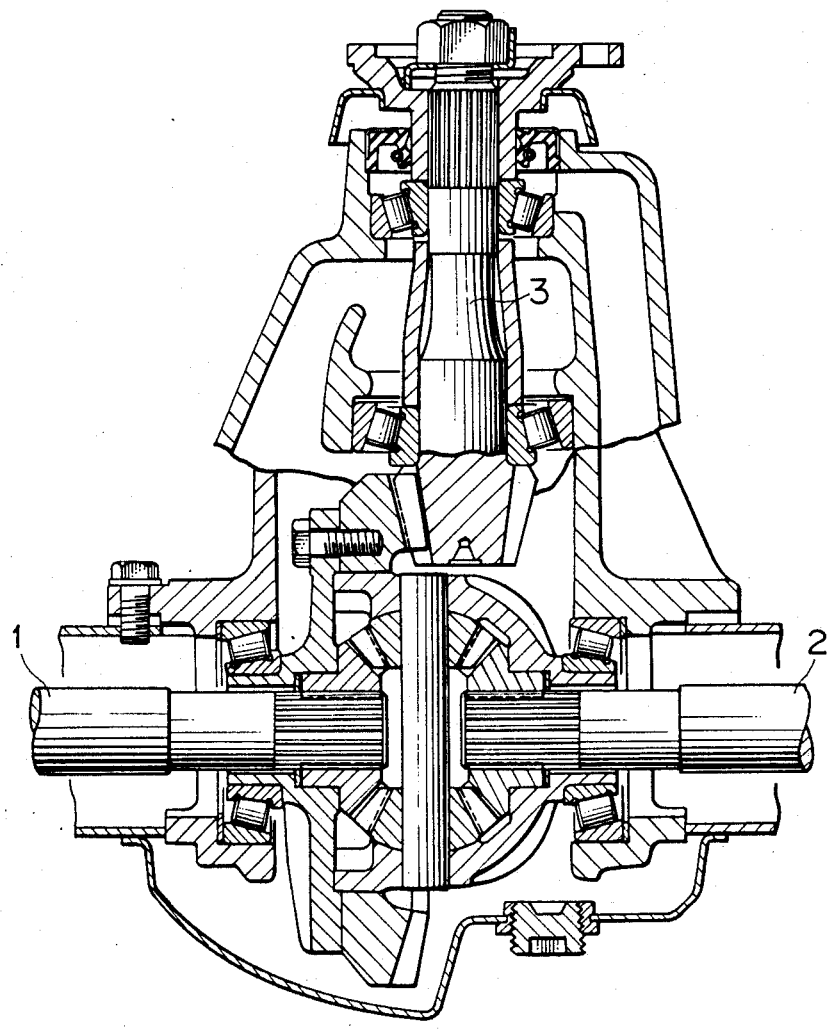
FIG. 4 is a sectional view of a known differential gear device.
Figure 5:
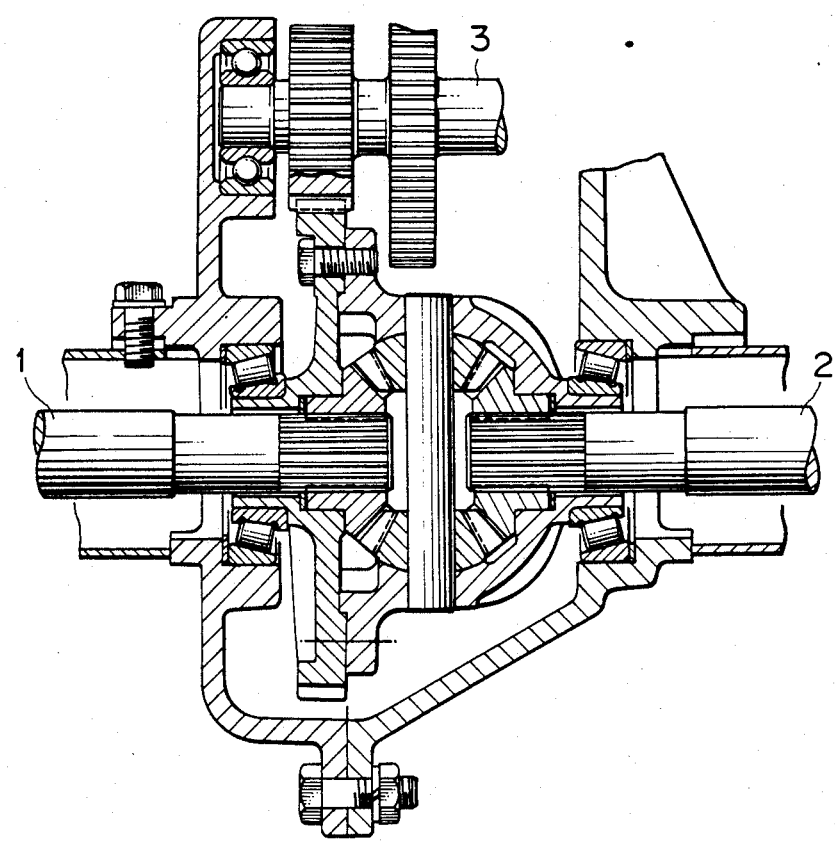
FIG. 5 is a sectional view of another known differential gear device.

Referring now to FIG. 3 which is a sectional view of another embodiment of the differential gear device in accordance with the invention, external splines or internal splines are provided on the same side of the differential gear box as the externally toothed gear, and the left axle or the right axle is made to extend through the drive, whereby the diameter of the drive is reduced as compared with the arrangement of the first embodiment.

More specifically, referring to FIG. 3, an eccentric member 42, which is provided on the hollow input shaft 41, carries an externally toothed gear 44 through the intermediary of an eccentric bearing 43. The externally toothed gear 44 inscribes in the internal teeth of an internally toothed gear 45 which are provided by outer pins 46. The externally toothed gear 44 is provided with internal splines 47.

A differential gear box 48 is disposed adjacent to the externally toothed gear 44. The differential gear box 48 is provided at its end adjacent to the externally toothed gear 44 with internal splines 49. A hollow cylindrical drive 50 is interposed between the internal splines 47 and the internal splines 49. The drive 50 is provided at its one end with external splines 52 which engage with the internal splines 47 of the externally toothed gear 44 and at its other end with external splines 51 which engage with the internal splines 49 of the differential gear box 48.

The differential gear box 48 has left and right axles 53 and 54 which extend to the left and right therefrom. One of these axles, the right axle 54 in the illustrated case, extends through the drive 50 and the input shaft 41.

In this embodiment, the driving power is derived from a swash-plate type hydraulic motor 55 surrounding the input shaft 41. The swash-plate type hydraulic motor is well known so that description of construction thereof is omitted in this specification.

The second embodiment of the differential gear device shown in FIG. 3 operates in a manner which is substantially same as that performed by the first embodiment shown in FIGS. 1 and 2.

In each of the first and second embodiments as described, spline-type engagement is adopted for the driving connection between the drive and the differential gear box and the driving connection between the drive and the externally toothed gear. The illustrated form of the spline-type connection, however, is only illustrative and any combination of the spline-type connections is usable provided that one of the spline-type connection is made through external splines, while the other is made through internal splines.

The differential gear device of the present invention described hereinbefore offers the following advantages.

Firstly, it is to be pointed out that the device can have a reduced size and the arrangement of the parts can be simplified by virtue of the fact that the input shaft is concentric with the axles.

It is also to be noted that a large reduction ratio is obtainable because the rotation of the input shaft is transmitted to the differential gear box at a reduced speed through the inscribe meshing type planetary reduction gear. This eliminates the necessity for the provision of a multiple stages of the reduction gears, thus contributing to a reduction in the production cost.

The differential gear device of the present invention enables an easy installation of a friction-type transmission device on the input side thereof. This type of transmission device is operable at high speed and allows an easy speed control.

In addition, the hollow input and output shafts enables the weight of the whole device to be reduced.

Furthermore, the drive which is supported in a floating manner or oscillatably effectively absorbs any machining or assembly error between two members associated therewith. In consequence, the requirement for the machining and assembly precisions of these parts becomes less severe.

The externally toothed gear is required only to have splines in addition to the external teeth. This enables the eccentric bearing to have a greater inside diameter and, hence, to accommodate a hollow input shaft having a greater inside diameter. This in turn enables an axles of a greater diameter to be extended through the input shaft.

In the embodiment in which the differential gear box is accommodated in the hollow drive, the axial length of the device is reduced to realize a reduction in the overall size and weight of the device.

Finally, the embodiment having the external or internal splines provided on the portion of the differential gear box adjacent to the externally toothed gear enables the outside diameter of the drive to be reduced, thus contributing to the reduction in the size and weight of the device.

What is claimed is:

1. A differential gear device incorporating an internal meshing type planetary reduction gear comprising:
    an externally toothed gear carried by a hollow input shaft through an eccentric member and an eccentric bearing;
    an internally toothed gear meshing with said externally toothed gear;
    a differential gear box disposed adjacent to said externally toothed gear;
    a hollow drive which provides a driving connection between said externally toothed gear and said differential gear box;
    internal splines or external splines provided on said externally toothed gear;
    external splines or internal splines provided on said differential gear box;
    external splines or internal splines provided on one end of said drive and engaging with said internal splines or external splines of said externally toothed gear;
    internal splines or external splines provided on the other end of said drive and engaging with said external splines or internal splines of said differential gear box; and
    left and right axles extending to the left and right from said differential gear box;
    one of said left and right axles extending through said input shaft.

2. A differential gear device incorporating an internal meshing type planetary reduction gear according to claim 1,
    wherein said external splines or said internal splines of said differential gear box is provided on the outer periphery of the end of said differential gear box opposite to said externally toothed gear, and
    wherein said differential gear box is disposed in said hollow drive.

3. A differential gear device incorporating an internal meshing type planetary reduction gear according to claim 1,
    wherein said external splines or said internal splines of said differential gear box is provided on the end of said differential gear box adjacent to said externally toothed gear, and
    wherein one of said left and right axles extends both through said hollow drive and said input shaft.

* * * * *